(12) United States Patent
Prieto et al.

(10) Patent No.: US 9,692,083 B2
(45) Date of Patent: Jun. 27, 2017

(54) LITHIUM-ION BATTERY HAVING ORGANIC-INORGANIC HYBRID SOLID ELECTROLYTE

(71) Applicants: COLORADO STATE UNIVERSITY RESEARCH FOUNDATION, Fort Collins, CO (US); PRIETO BATTERY, INC., Fort Collins, CO (US)

(72) Inventors: Amy L. Prieto, Fort Collins, CO (US); Derek C. Johnson, Johnstown, CO (US); Matthew T. Rawls, Denver, CO (US)

(73) Assignee: Prieto Battery, Inc., Fort Collins, CO (US)

( * ) Notice: Subject to any disclaimer, the term of this patent is extended or adjusted under 35 U.S.C. 154(b) by 338 days.

(21) Appl. No.: 13/956,320

(22) Filed: Jul. 31, 2013

(65) Prior Publication Data

US 2014/0162135 A1    Jun. 12, 2014

Related U.S. Application Data

(60) Provisional application No. 61/677,872, filed on Jul. 31, 2012.

(51) Int. Cl.
| | | |
|---|---|---|
| B05D 3/02 | (2006.01) | |
| H01M 10/056 | (2010.01) | |
| H01M 10/0525 | (2010.01) | |
| H01M 10/0585 | (2010.01) | |

(52) U.S. Cl.
CPC ........ *H01M 10/056* (2013.01); *B05D 3/0254* (2013.01); *H01M 10/0525* (2013.01); *H01M 10/0585* (2013.01)

(58) Field of Classification Search
CPC .......... H01M 10/056; H01M 10/0525; H01M 10/0585
See application file for complete search history.

(56) References Cited

U.S. PATENT DOCUMENTS

| | | | | |
|---|---|---|---|---|
| 5,538,814 A | * | 7/1996 | Kamauchi | H01M 4/131 429/231.8 |
| 5,605,550 A | * | 2/1997 | Jensen | H01M 4/08 29/623.1 |
| 6,080,504 A | * | 6/2000 | Taylor | C25D 5/18 205/103 |

(Continued)

OTHER PUBLICATIONS

Google definitions for "Electrodeposition" and "Electrophoresis".*

(Continued)

*Primary Examiner* — Sarah A Slifka
*Assistant Examiner* — Brian Ohara
(74) *Attorney, Agent, or Firm* — Cochran Freund & Young LLC; Samuel M. Freund

(57) ABSTRACT

Methods are described for forming insulating hybrid organic-inorganic solid electrolytes on conducting electrodes that are active materials in Li-ion batteries by electrochemical deposition, and for forming second conducting electrodes on the solid electrolytes using aqueous slurries, whereby Li-ion battery cells having solid electrolytes are generated. X-ray photoelectron spectroscopy is utilized for determining that the solid electrolytes are defect and pinhole free.

11 Claims, 6 Drawing Sheets

(56) References Cited

U.S. PATENT DOCUMENTS

| | | | | |
|---|---|---|---|---|
| 6,099,990 | A * | 8/2000 | Denton, III | H01M 4/583 423/447.5 |
| 6,596,441 | B1 * | 7/2003 | Green | H01G 9/022 429/188 |
| 6,656,634 | B2 * | 12/2003 | Hosoya | H01M 4/131 429/218.1 |
| 7,045,247 | B1 * | 5/2006 | Copeland | H01M 4/02 429/164 |
| 2002/0006552 | A1 * | 1/2002 | Ishida | H01M 4/13 429/303 |
| 2002/0009636 | A1 * | 1/2002 | Endo | H01M 2/0212 429/209 |
| 2002/0136953 | A1 * | 9/2002 | Vaughey | C22C 9/00 429/218.1 |
| 2003/0134177 | A1 * | 7/2003 | Furuya | C25D 15/00 429/480 |
| 2004/0002003 | A1 | 1/2004 | Yamada et al. | |
| 2005/0208371 | A1 * | 9/2005 | Kim | H01M 4/13 429/137 |
| 2006/0019167 | A1 | 1/2006 | Li | |
| 2007/0221265 | A1 * | 9/2007 | Affinito | H01M 4/02 136/243 |
| 2009/0263707 | A1 * | 10/2009 | Buckley | H01M 4/622 429/94 |
| 2009/0305131 | A1 * | 12/2009 | Kumar | B22F 3/1146 429/206 |
| 2010/0104948 | A1 * | 4/2010 | Skotheim | H01M 4/02 429/322 |
| 2010/0167128 | A1 | 7/2010 | Ho et al. | |
| 2011/0027656 | A1 * | 2/2011 | Chiang | G02F 1/1523 429/246 |
| 2011/0287305 | A1 * | 11/2011 | Scordilis-Kelley | H01M 2/1653 429/163 |
| 2012/0052401 | A1 | 3/2012 | Goodenough et al. | |
| 2012/0073971 | A1 * | 3/2012 | Prieto | C25D 13/02 204/490 |

OTHER PUBLICATIONS

International Search Report, International Searching Authority, Mar. 13, 2014, pp. 1-15.

* cited by examiner

LITHIUM-ION BATTERY HAVING ORGANIC-INORGANIC HYBRID SOLID ELECTROLYTE

CROSS-REFERENCE TO RELATED APPLICATIONS

The present application claims the benefit of U.S. Provisional Patent Application No. 61/677,872 for "Electrochemical Deposition Of An Organic-Inorganic Hybrid Solid Electrolyte For Lithium Ion Batteries" which was filed on Jul. 31, 2012, the entire content of which is hereby specifically incorporated by reference herein for all that it discloses and teaches.

FIELD OF THE INVENTION

The present invention relates generally to lithium-ion batteries and, more particularly to lithium-ion batteries having organic-inorganic hybrid solid electrolyte.

BACKGROUND OF THE INVENTION

Rechargeable lithium-ion batteries are widely used for portable electronics because lithium is the lightest and most electropositive element, a combination of properties that are important for high energy density. Such batteries can store more energy than Pb-acid, Ni—Cd, and NiMH batteries, and they have long shelf and cycle lives. Because of this, there is a significant market centered on lithium-intercalation batteries. There are, however, several drawbacks associated with commercially available Li-ion batteries, which can pose safety hazards due to dendritic growth of Li metal onto graphite negative electrodes having the potential to produce an internal short. Moreover, the organic liquid electrolytes employed are flammable, and can produce toxic hydrofluoric acid when exposed to water. A solid-state battery that does not contain liquid electrolyte and does not form metallic lithium is desirable.

An additional drawback of present Li-ion batteries that prohibits widespread adoption in the electric and hybrid electric vehicle market is insufficient power density. The principal challenge to achieving high power densities in Li-ion batteries is increasing the rates of charge and discharge. One solution which will provide higher power density by increasing these rates is to utilize a three-dimensional Li-ion cell architecture having electrically isolated interpenetrating electrodes. Such an arrangement decreases the characteristic transport lengths of Li-ions moving in and between the electrodes, and can also dramatically increase the interfacial surface area between the electrodes. These benefits are demonstrated by the following relationship for power density.

$$\text{Power Density} \propto \frac{\text{Voltage} \times \text{Lithium ion conductivity} \times \text{Surface area}}{\text{Lithium ion transport length}}$$

Fabrication of a three-dimensional cell having high interfacial surface areas and short characteristic diffusion lengths requires three-dimensional electrodes having irregular surfaces. Coating such irregular shaped three-dimensional electrodes with a material that is electrically insulating as well as Li-ion conducting on the nanoscale is challenging.

SUMMARY OF THE INVENTION

Embodiments of the present invention overcome the disadvantages and limitations of prior art by providing methods for forming a solid electrolyte on an electrode.

Another object of embodiments of the present invention is to provide methods for forming a solid electrolyte on an electrode that provides electrical insulation while permitting the flow of lithium ions therethrough.

Yet another object of embodiments of the present invention is to provide a method for forming an electrode on a substrate.

Still another object of embodiments of the present invention is to provide a method for forming a second electrode on a solid electrolyte deposited on a first electrode.

Another object of embodiments of the present invention is to provide a Lithium-ion battery having a solid electrolyte.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method for forming a conformal, pinhole-free, hybrid organic-inorganic solid electrolyte on an electrode, hereof, includes: preparing a solution comprising at least one organic carbonate and at least one lithium salt; attaching the electrode to a current collector; immersing the electrode in the solution in an electrochemical cell under an inert atmosphere; immersing a lithium electrode attached to an electrical lead in the solution; applying a voltage to the electrode corresponding to a voltage of electrodeposition of the solid electrolyte generated thereby from the solution until the current attains a value of between about the theoretical gravimetrical capacity of the electrode multiplied by the electrode mass and divided by ten and about the theoretical gravimetrical capacity of the electrode multiplied by the electrode mass and divided by 100; recording the open circuit voltage between the electrode and the lithium electrode as a function of time to determine whether the voltage is stable; and applying the voltage corresponding to the electrodeposition voltage of the solid electrolyte to the electrode until the current attains a value of between about the theoretical gravimetrical capacity of the electrode multiplied by the electrode mass and divided by ten and about the theoretical gravimetrical capacity of the electrode multiplied by the electrode mass and divided by 100 until the open circuit voltage is stable.

In another aspect of the present invention and in accordance with its objects and purposes, the method for forming a conformal, pinhole-free, hybrid organic-inorganic solid electrolyte on an electrode, hereof, includes: preparing a solution comprising at least one organic carbonate and at least one lithium salt; attaching the electrode to a current collector; immersing the electrode in the solution in an electrochemical cell under an inert atmosphere; immersing a lithium electrode attached to an electrical lead in the solution; applying a current to the electrode having a value of between about the theoretical gravimetrical capacity of the electrode multiplied by the electrode mass and divided by ten and about the theoretical gravimetrical capacity of the electrode multiplied by the electrode mass and divided by 100, until the voltage between the electrode and the lithium electrode reaches a voltage of electrodeposition of the solid electrolyte generated thereby from the solution; recording the open circuit voltage between the electrode and the lithium electrode as a function of time to determine whether the voltage is stable; and applying current to the electrode having a value of between about the theoretical gravimetrical capacity of the electrode multiplied by the electrode mass and divided by ten and about the theoretical gravimetrical capacity of the electrode multiplied by the electrode mass and divided by 100, until the voltage between the electrode and the lithium electrode reaches a value corresponding to the electrodeposition voltage of the solid electrolyte, until the open circuit voltage is stable.

In yet another aspect of the present invention and in accordance with its objects and purposes, the method for forming an electrode on a substrate, hereof, includes: forming a particle-based slurry comprising water; an active anode or cathode material in particulate form; a water-soluble polymer binder; and particulate, carbon-based conducting additive; homogenizing the slurry; applying the homogenized slurry to the substrate; and slowly removing the water such that the substrate is not damaged.

In still another aspect of the present invention and in accordance with its objects and purposes the lithium-ion battery cell, hereof, includes: an anode; a conformal, pinhole-free, hybrid organic-inorganic solid electrolyte formed on said anode.

Benefits and advantages of the present invention include, but are not limited to, lithium-ion batteries having freedom from dendritic growth of Li metal onto graphite negative electrodes with consequent potential for producing internal shorts, and freedom from flammable, caustic liquid electrolytes.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
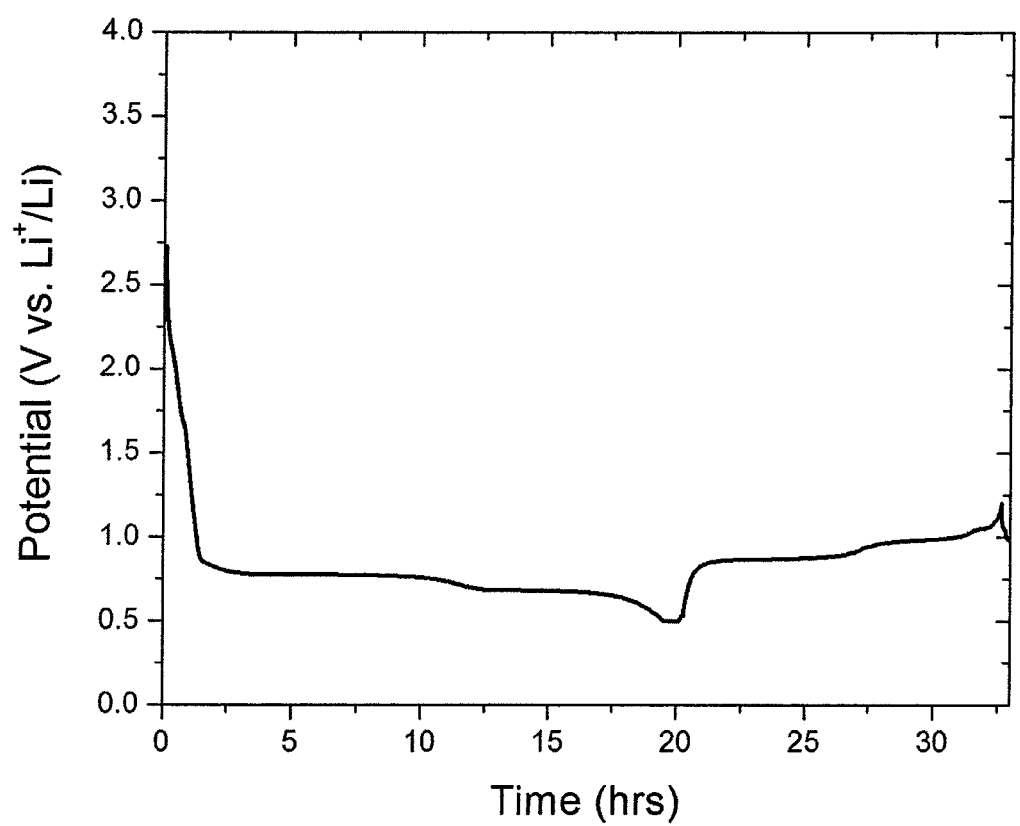
FIG. 1 is a characteristic voltage profile collected from a two electrode electrochemical cell consisting of $Cu_2Sb$ electroplated onto the surface of a copper foil current collector as the positive electrode and lithium foil as the negative and reference electrode, where the initial cell potential was approximately 2.75 V vs. $Li^+/Li$ and decreased as a function of time when a negative current of approximately 4 μA was applied to the cell, such that at approximately 20 h, the cell potential reached the predetermined voltage cutoff of 0.5 V vs. $Li^+/Li$, at which time the current was no longer applied, the open circuit voltage was recorded for approximately 30 min., a positive current of approximately 4 μA was then applied to the cell resulting in an increase of the cell potential until the cell voltage reached a value of 1.2 V vs. $Li^+/Li$.

One route for forming uniform, defect-free coatings having nanoscale thicknesses on complex three-dimensional electrodes involves the use of electrochemical deposition techniques. Briefly, embodiments of the present invention include implementation and characterization of a hybrid organic-inorganic solid electrolyte electrochemically deposited on conducting electrodes that are active materials in Li-ion batteries.

It has been reported that during the cycling of a Li-ion battery cell, a solid electrolyte is often inadvertently electrochemically deposited on the surface of Li-ion electrode materials at the interface between the solid electrode and the liquid electrolyte. This degradation process occurs because the liquid electrolyte is electrochemically unstable at the electrode surface in the range of potentials applied during charging and discharging cycles. As the liquid electrolyte typically includes organic carbonate solvents and lithium containing inorganic salts, the resulting electrochemically deposited film consists of both organic and inorganic components. The electrochemically deposited film continues to grow until it becomes sufficiently insulating that electrons can no longer interact with the liquid electrolyte; thus terminating the decomposition of the liquid electrolyte.

Because the electrochemical growth requires electrons to pass through an insulating film formed thereby, the process is considered to be a self-limiting electrochemical deposition. Because the process is self-limiting, the resulting films are on the order of 100 nm thick or less. In order to utilize the typically unwanted and potentially harmful solid electrolyte, the film growth must be controlled in such way that the electrically insulating characteristic is retained while permitting lithium-ion transport through the conformal, pinhole free coating.

A. Electrolyte Preparation and Electrodeposition onto a First Electrode:

A process for the deposition from solution of a hybrid organic-inorganic electrolyte with the needed properties to function as a solid-state electrolyte in a lithium-ion battery is now described. To electrochemically deposit a solid electrolyte onto the surface of a Li-ion battery cell electrode, an electrode that is electrically conducting and mechanically stable, that is will not delaminate from the current collector when submersed in a liquid carbonate solution, must be prepared. Among the electrode materials for which this process is applicable are anode materials that are directly attached to a current collector. However, the use of other electrode materials is not precluded as long as the two above-mentioned criteria are satisfied. Copper and nickel are suitable materials for the current collector since for a current collector to be functional it must be electrically conducting and electrochemically stable at reducing potentials, typically between about 0 and about −3.5 V vs. Ag/AgCl. Once the electrode has been fabricated, the deposition solution is prepared.

Solid electrolyte electrodeposition solutions include liquids containing at least one organic carbonate and at least one lithium salt. Effective solutions may have a variety of components and corresponding concentrations. For example, the solution described in EXAMPLE 1, hereinbelow, contains ethylene carbonate and dimethyl carbonate having a mass ratio of 3 to 7, and 1 M LiPF$_6$. In accordance with the teachings of the present invention, other carbonates, such as dimethyl, ethyl-methyl, and propylene carbonates, as examples, and lithium salts, such as LiAsF$_6$, LiClO$_4$, LiBF$_4$, LiSO$_3$CF$_3$, LiN(SO$_2$CF$_3$)$_2$, LiPF$_3$(C$_2$F$_5$)$_3$, Li bis (oxalato)borate and LiC(SO$_2$CF$_3$)$_3$, as examples, may be utilized. As indicated, this is not a complete listing. Further, additives in much lower concentrations may be added to the solution to induce a level of control, such as thickness, as an example, over the final solid electrolyte. Such additives are electrochemically active at the electrode surface, for example, having unsaturated bonds that allow them to undergo reductive polymerization on the anode and oxidative polymerization on the cathode, resulting in the products from the additives being incorporated into the solid electrolyte. Examples of additives include vinylene carbonate, vinyl ethylene carbonate, and allyl ethyl carbonate. Again, this list is not exhaustive.

The water concentration of the solutions is maintained at levels less than or equal to approximately 50 ppm. Dissolved oxygen is also kept at a low value, and removal procedures for reducing this species may be undertaken, since water and oxygen can have a negative effect on the electrochemical deposition of the solid electrolyte. In furtherance of this concern, the solution and electrode are placed under an inert atmosphere, such as argon.

The electrode and solution are introduced into an electrochemical cell, under an inert atmosphere, to electrochemically deposit the solid electrolyte. The electrochemical cell includes a vessel that holds the liquid solution, the electrode, onto which the solid electrolyte is to be electrodeposited, submersed in the liquid solution and having an attached electrical lead protruding out of the solution, and a lithium metal electrode submersed in the solution and having an attached electrical lead protruding out of the solution. The lithium metal serves both as the negative and reference electrodes as well as a source of additional Li-ions. Since the lithium metal is the negative electrode, the electrode to which the solid electrolyte coating is applied is the positive electrode. The cell may be sealed to prevent the volatilization of the liquid, as well as to prevent the introduction of oxygen and/or moisture. Once sealed, a current is applied to the electrode to which the solid electrolyte is to be electrodeposited. The magnitude and polarity of the current is determined by the electrode material. If the electrode is an anode material, such as that described in EXAMPLE 1, hereinbelow, the current polarity is negative. For this type of electrode, the application of a negative current will result in a decrease in the cell potential as a function of time. Reactions that occur while the current polarity is negative are electrochemical reduction reactions. However, if the electrode is a cathode material, the current polarity is positive. For this type of electrode, the application of a positive current will result in an increase in the cell potential as a function of time. Reactions that occur while the current polarity is positive are electrochemical oxidation reactions. The magnitude of the current is calculated by multiplying the theoretical gravimetrical capacity of the electrode (mAh/g) by the measured mass of the electrode material and dividing it by the number of hours to complete the half cycle. As a reference, 20 h is used in EXAMPLE 1, hereinbelow. However, a reasonable range is between about 10 h and about 100 h. While the current is applied to the electrode, the resulting voltage (V vs. Li/Li$^+$) and capacity of the electrode (mAh) are recorded.

Once the half cycle is complete, the differential capacity can be calculated from the data collected. The differential capacity is defined as:

$$\left(\frac{Cap_{electrode}}{V_{cell}}\right)_{t=i} - \left(\frac{Cap_{electrode}}{V_{cell}}\right)_{t=i-\Delta t},$$

where Cap$_{electrode}$ is the capacity of the electrode in mAh/g (milliamp hours per gram), V$_{cell}$ is the voltage of the cell, t is the time for which the data was recorded, and Δt is the time step between recorded data. The differential capacity is then plotted as a function of voltage. The differential capacity will be negative for reductive processes and positive for oxidative processes. Peaks appear at potentials corresponding to various electrochemical processes that are occurring within the electrochemical cell. Voltages are assigned corresponding lithium insertion, alloying, displacement, and/or conversion reactions, using standard techniques. The reaction(s) that occur depends on the electrode material. The peak(s) that cannot be accounted for in terms of the lithium insertion, alloying, etc., corresponds to the electrodeposition of the solid electrolyte. Multiple peaks may be observed related to the electrode material and the composition of the liquid carbonate-based electrolyte. Therefore, to electrochemically deposit a hybrid organic-inorganic solid electrolyte, potentiostatic or galvanostatic techniques utilizing the above-determined potential are utilized.

When a potentiostatic electrochemical deposition technique is used, a voltage corresponding to the electrodeposition of the solid electrolyte, as determined from the differential capacity as a function of voltage plot, described above, is applied until the current goes to zero. Zero current suggests that the system has reached thermodynamic equilibrium and thus the solid electrolyte is completely formed. This in practice, however, is difficult to implement. Thus, when using a potentiostatic technique, it is also acceptable to hold the potential until the current reaches a value of approximately C/20. A rate of C/20 is defined as the current required for achieving the theoretical capacity for a given mass of active material in the electrode in 20 h. For example, if the capacity of the active material in the electrode is 100 mAh/g, the current required for achieving a C/20 rate for 1 g of active material is 5 mA. Once the current has decrease below the calculated value, the open circuit potential is recorded. If the voltage remains constant, for example, less than 30 mV variation over an hour for the system described in EXAMPLE 1, hereinbelow, then the system has reached equilibrium. One might use a different criterion for other systems, however. If the voltage is not stable, then the potential should be reapplied until the current drops below the calculated C/20 value. This process is continued until the voltage is stable, thereby indicating that the system is at equilibrium. It should be noted that it has been determined to be generally true that a rate of about C/20 is sufficient to result in a solid electrolyte that is defect and pinhole free. C-rates varying from approximately C/10 to approximately C/100 also result in acceptable solid electrolytes. The optimum rate should be determined for the specific electrode material.

When using a galvanostatic electrochemical deposition technique, a current corresponding to a C/20 rate is applied until the voltage determined by the differential capacity as a function of voltage plot described above is reached. Once the voltage has reached the predetermined value, the open circuit potential is recorded. If the voltage remains constant, then the system has reached equilibrium. If the voltage is not stable, then the current should be reapplied until the voltage reaches the predetermined value. This process is continued until the voltage is stable, thereby indicating that the system is at equilibrium. As with the potentiostatic technique, the C-rate can be varied over a particular range resulting in a defect and pinhole free solid electrolyte. The optimal rate is determined for specific electrode materials. Application of this embodiment is described in EXAMPLE 1, hereinbelow.

B. Characterization of Electrolyte-Coated First Electrode:

A characterization procedure for establishing that the solid electrolyte formed in accordance with the method described hereinabove is defect and pinhole-free, is now described. Upon deposition of the solid electrolyte, evaluation of the surface is an important step. As the solid electrolyte film is both thin and chemisorbed to the surface of the electrode, preparing a free-standing film of the solid electrolyte is not possible. Thus, traditional Li-ion battery methods employed in the production and testing of solid electrolytes cannot be used as it is difficult to probe the solid electrolyte without introducing failures. If pinholes and/or defects are present in the film, an internal short will occur when the second electrode is applied to complete the battery structure. In accordance with the teachings of the present invention, X-ray photoelectron spectroscopy is used to quantitatively determine the existence, or absence, of pinholes in the solid electrolyte without inducing damage.

To implement this embodiment of the invention, two samples are required: (1) an electrode for which no electrochemical deposition of the solid electrolyte has occurred; and (2) an identical electrode onto which a solid electrolyte has been formed by electrodeposition in accordance with the teachings of the present invention described hereinabove. The samples are thoroughly cleaned using solvents that remove the electrochemical deposition solution and any associated salts described hereinabove, as an example, without damaging the solid electrolyte. The final solvent is chosen to have significant volatility, and does not leave a residual film on the surface of the solid electrolyte. Useful solvents include dimethyl, diethyl, and ethyl-methyl carbonate, as all of these solvents readily dissolve the lithium-based inorganic salts utilized in the electrochemical deposition solution described hereinabove, as well as the organic constituents of the deposition solution. The final solvent used was anhydrous methanol. Clearly, many other solvents and combinations of solvents may be used, as long as they satisfy the above-mentioned criteria. Once thoroughly cleaned, both samples are subjected to X-ray photoelectron spectroscopy (XPS) analysis, with spectra being collected using an appropriate X-ray source, such as monochromatic Al K$\alpha$, with a step size of 1.6 eV/step and a binding energy range of about 1200 eV to about 10 eV. The step size and range can be varied to adjust for the detection of the appropriate elements contained in the electrode material and solid electrolyte. To determine if the solid electrolyte is pinhole and defect free, the XPS spectrum of the first sample is compared to the spectrum of the second sample with the electrodeposited solid electrolyte. If the elements detected in the first sample spectrum are not detected in the second sample spectrum, it can be concluded that the solid electrolyte has sufficient thickness, and is defect as well as pinhole free. Specific application of this embodiment is contained in EXAMPLE 2, hereinbelow.

C. Incorporation of a Second Electrode to Complete a Li-Ion Battery Cell:

An electrode slurry composition for allowing a second electrode to be incorporated onto the electrolyte-coated first electrode to complete a Li-ion battery cell without inducing damage to the electrochemically deposited solid electrolyte, is described. Once the solid electrolyte has been demonstrated to conformally coat the first electrode material, a second electrode is added to complete the cell. The second electrode is applied to the electrolyte-coated first electrode using a particle-based slurry. Such slurries have traditionally consisted of: (1) an active anode or cathode material in particulate form; (2) a polymer binder, most commonly polyvinylidene fluoride (PVDF); (3) a particulate, carbon-based conducting additive; and (4) a solvent that dissolves the polymer binder and provides a good homogeneous suspension of the active material and conductor, the most commonly used such solvent being 1-methyl-2-pyrrolidinone (NMP). It should be noted, however, that a slurry including the above-mentioned constituents has traditionally been applied to a current collector, and the solvent removed before incorporation into the battery cell. In the present situation, this procedure is not possible because of the fragile nature of the approximately 100 nm thick solid electrolyte.

Multiple aspects of the application process are considered when incorporating such a slurry into a battery cell having a sub-100 nm thick solid electrolyte. First, the slurry, through either its application or composition, must not damage the solid electrolyte. Thus, the application of this electrode to complete the Li-ion battery cell must not induce defects or pinholes thereby causing an internal short circuit that would result in a defective cell. To avoid causing damage to the solid electrolyte, the following procedure, ensures that application of the particle slurry results in a functioning cell: (1) determining the compatibility of the solvent with the solid electrolyte, (2) determining an appropriate binder based on the solvent, (3) ensuring the solution remains homogeneous during the application and curing process, and (4) ensuring that the packing density is high so that there are no void spaces in the electrode structure.

For solid electrolytes electrochemically deposited utilizing the method described hereinabove, water is a solvent that does not induce defects or pinholes. With the choice of water as an appropriate solvent, the other components of the slurry are chosen. First, the active material, defined as a substance that is active in the lithium-ion electrochemical storage process, is selected. If the second electrode is the positive electrode in a lithium ion cell, appropriate active material candidates may be any cathode material. Examples include $LiFePO_4$, $LiCoO_2$, $LiMnO_2$, and $LiNi_{0.4}Co_{0.2}Mn_{1.4}O_4$, to name a few such compositions. If the second electrode is the negative electrode in a lithium ion cell, appropriate active material candidates may be any anode material. Some commonly used examples are carbon, silicon, tin, and lithium titanate, to name a few such materials. Since PVDF is insoluble in water, a water-soluble polymer suitable for transporting Li-ions is selected as the binder. Functional groups that are suitable include: polyethylene oxide, polyethylene glycol, polypropylene glycol, and polypropylene oxide, as examples. This list is clearly not exhaustive, and that relevant criteria are that the polymer is water soluble and can be induced to transport lithium-ions. In order to induce lithium-ion transport in the water soluble polymer, a lithium containing salt is added. Some examples of salts that induce lithium-ion transport are lithium perchlorate and lithium trifluoromethanesulfonate. The concentration of the salt may be approximately 0.125 mole fraction when using the molecular weight of the repeat unit. That is, the molar ratio of the concentrations of the repeat unit to the salt, [repeat unit]:[salt], may be 8:1. In EXAMPLE 3, hereinbelow, polyethylene glycol was used as the water soluble binder, with lithium trifluoromethanesulfonate for inducing Li-ion transport. Once the active electrode material and electronic conductor are added to the aqueous solution and homogenized, the solution was found to remain homogeneous. To ensure the homogeneity of the slurry, effective concentrations of the above constituents are:

| | |
|---|---|
| Active material | 50-93% by mass |
| Water soluble polymer binder | 5-30% by mass |
| Lithium-ion salt | 1-12% by mass |
| Conducting graphite | 1-8% by mass |

In order for the solution to remain homogeneous during the curing process so that the packing density remains high, the water is allowed to evaporate at atmospheric pressure and room temperature. Once the water evaporates, residual moisture is removed without inducing damage in the second electrode or the solid electrolyte, by introducing the sample into a vacuum oven, and reducing the pressure over the course of approximately 30 min. to about −25 mmHg (gauge). The temperature is then increased to about 100° C. at approximately 1.25° C./min. A final temperature of approximately 90° C. to about 120° C. removes the residual moisture. Additionally, the ramp rate can be less than about 1° C./min., and as high as approximately 15° C./min. Keeping the sample overnight under vacuum at about 100° C. will remove the residual moisture, but it should be noted that the time may be reduced depending on the sample and conditions. Once the residual moisture is removed, the sample is removed from the vacuum oven and placed in an inert atmosphere for subsequent incorporation into a sealed cell. Once the cell is sealed, it may be removed from the inert atmosphere and used as a Li-ion battery cell. Specific application of this embodiment is contained in EXAMPLE 3, hereinbelow.

Having generally described the invention, the following EXAMPLES provides additional details.

Example 1

The electrochemical deposition of a hybrid organic-inorganic solid-state electrolyte onto copper antimonide ($Cu_2Sb$), which is a known negative electrode lithium intercalation material, is described. Copper antimonide was electrochemically deposited onto one side of a copper foil substrate using a known procedure. The $Cu_2Sb$ was then incorporated into an electrochemical cell. For this example, the foil containing the electrodeposited $Cu_2Sb$ was cut into a ½-inch diameter disk for subsequent incorporation into a modified Swagelok coin cell using a standard hole punch. Clearly, any electrode dimension may be used without affecting the invention. In this case, the dimension was dictated by the physical size of the electrochemical cell. Once the disk sample was inserted into the modified Swagelok cell, the cell was transferred into an argon dry box that contained less than 1 ppm oxygen and water. To complete the cell, a porous electrical polyethylene, polypropylene separator designed to allow Li-ion transport through the membrane was placed on top of the $Cu_2Sb$. One such a separator is produced by Celgard®. Liquid electrolyte obtained from Novolyte, included 3:7 by mass of ethylene carbonate:diethyl carbonate with 1 M $LiPF_6$, was added to the modified Swagelok cell and allowed to completely soak through the separator. Lithium metal was then cleaned to remove any residual oxide or nitride that had formed on the lithium metal and punched into a ½-inch diameter disk in a method similar to that described above for $Cu_2Sb$. The lithium was then inserted into the modified Swagelok cell on top of the separator and the cell sealed for removal from the argon box.

Figure 2:
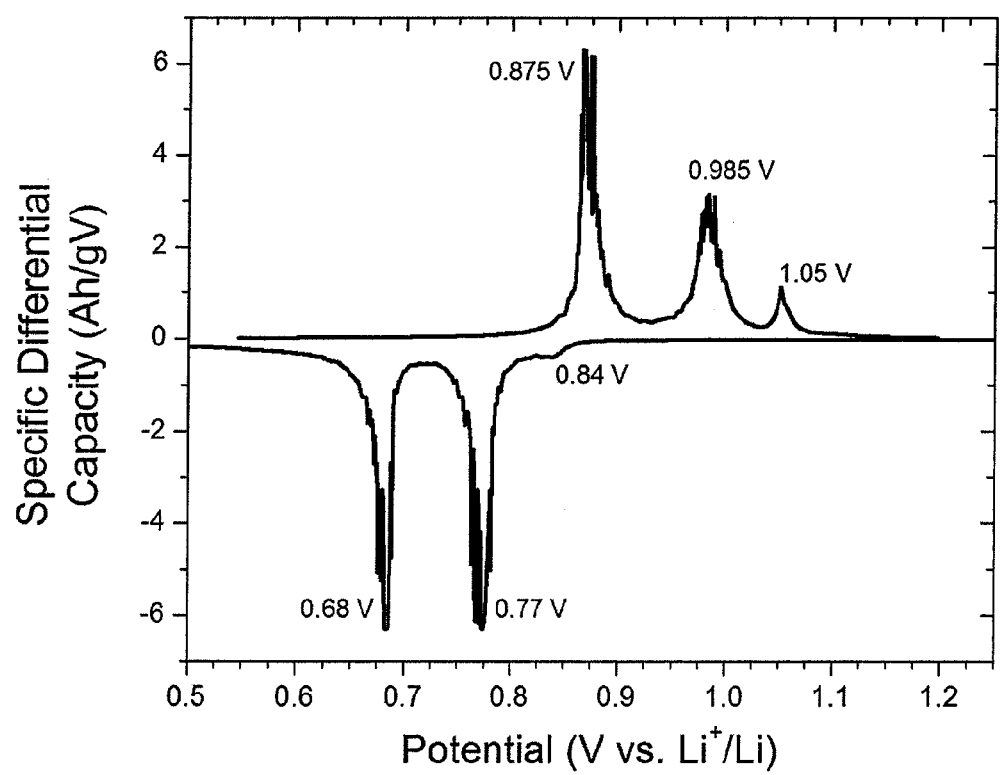
FIG. 2 is a graph of the specific differential capacity as a function of cell potential vs. $Li^+/Li$, the original data used to generate this plot is contained in FIG. 1, hereof, where the electrochemically induced reduction reactions, as indicated by negative specific differential capacity peaks, as well as electrochemically induced oxidation reactions, as indicated by positive differential capacity peaks, are observed for the cell which consisted of $Cu_2Sb$ as the positive electrode and lithium foil as the negative and reference electrode.

To determine the voltages for which the solid electrolyte electrodeposited as well as voltages for which lithium intercalates into $Cu_2Sb$ and is extracted from $Li_3Sb$, the cell described above was attached to an Arbin BT2143 battery cycler. A current with a negative polarity that corresponded to a C/20 rate was applied to the cell for which $Cu_2Sb$ is the positive electrode and lithium is the negative and reference electrode, until the voltage decreased to 0.5V vs. $Li/Li^+$. The negative polarity current induces electrochemical reduction reactions that can be attributed to solid electrolyte formation as well as those associated with lithium-ion insertion, alloying, displacement, and/or conversion reactions that store electrochemical energy within the electrode for this example. Once the cell reached 0.5V vs. $Li/Li^+$, the polarity of the current was switched to positive while maintaining the same magnitude and applied until the cell reached a voltage of 1.2V vs. $Li/Li^+$. The positive polarity current induces electrochemical oxidation reaction that can be attributed to electrochemical reactions that release energy from the electrode. The resulting voltage profile is illustrated in FIG. 1. The collected data was used to calculate the differential capacity, which was then plotted as a function of voltage and is shown in FIG. 2. Peaks in the plot contained in FIG. 2 are an indication of electrochemical processes that are occurring within the cell. As shown in FIG. 2, electrochemical processes are occurring at 0.84, 0.77 and 0.68 V when a negative current is applied, and at 0.875, 0.985, and 1.05 V when a positive current is applied. As it has been previously demonstrated that the lithium insertion occurs at 0.77 and 68 V, while lithium extraction occurs at 0.875, 0.985 and 1.05 V, the voltage for which the hybrid organic-inorganic solid electrolyte forms is 0.84 V vs. Li/Li$^+$. It is important that all of the peaks associated with electrochemical oxidation reactions can be attributed to the release of energy from the electrode in this example. If additional peaks are observed, that is an indication that the solid electrolyte also undergoes an oxidation reaction indicating that it is not electrochemically stable. This instability is not desirable.

To electrochemically deposit the solid electrolyte to the positive electrode, in this example $Cu_2Sb$, a negative current corresponding to a rate of C/20 is applied until the cell voltage decreases to 0.84V vs. Li/Li$^+$. As long as the cell has reached thermodynamic equilibrium, the solid electrolyte will be completely formed at 0.84V vs. Li/Li$^+$. This result is advantageous since the solid electrolyte is completely formed without inducing an electrochemical reaction within the electrode, such as those associated with lithium-ion insertion, alloying, displacement, and/or conversion reactions. These reactions have been demonstrated to cause an expansion and contraction of the electrode that may induce cracking and/or other damage to the solid electrolyte. Therefore, the coating formed without inducing electrochemical reactions within the electrode is expected to be conformal and pinhole free; again allowing for the fact that the cell is at thermodynamic equilibrium. Experimental evidence for the $Cu_2Sb$ system presented hereinabove, however, suggests that this is a rate controlled electrochemical solid electrolyte growth process, as indicated by the width of the peaks contained in FIG. 2. Thus, it is advantageous to perform the complete cycle as described above, first applying a negative polarity current corresponding to a rate of C/20 until the cell voltage is 0.5V vs. Li/Li$^+$ and then applying a positive current corresponding to a rate of C/20 until the cell voltage is 1.05V vs. Li/Li$^+$. This will ensure that the hybrid organic-inorganic solid electrolyte has completely formed. If a complete cycle is performed, however, expansion and contraction of the electrode is inevitable. This is taken into consideration when choosing the applied current. A current associated with a rate as low as C/20 allows for the continuous formation of the solid electrolyte even when electrochemical reactions are occurring within the positive, $Cu_2Sb$, electrode while the voltage is below the potential for which it is formed. In this example, 0.84V vs. Li/Li$^+$. That this process results in a conformal pinhole free coating, is shown in EXAMPLE 2 hereinbelow.

Example 2

The characterization procedure for demonstrating that the solid electrolyte is defect and pinhole free is illustrated. A coated electrode is prepared in accordance with EXAMPLE 1. A complete cycle, also described in EXAMPLE 1, is performed. The modified Swagelok cell is disassembled and the $Cu_2Sb$ electrode, which includes a ½-in. diameter copper disk with $Cu_2Sb$ electrodeposited on one side as described above, is isolated from the other cell components, which are the separator and lithium metal. Before the liquid electrolyte evaporates, the $Cu_2Sb$ electrode is submersed in a diethyl carbonate solution to remove residual $LiPF_6$ salt and ethylene carbonate that may be on the surface. The $Cu_2Sb$ electrode is then rinsed in another diethyl carbonate solution followed by two rinsings with anhydrous methanol solutions. The goal of the rinsing procedure is to remove the liquid and salt components associated with the liquid electrolyte without damaging the electrochemically grown solid electrolyte.

Figure 3:
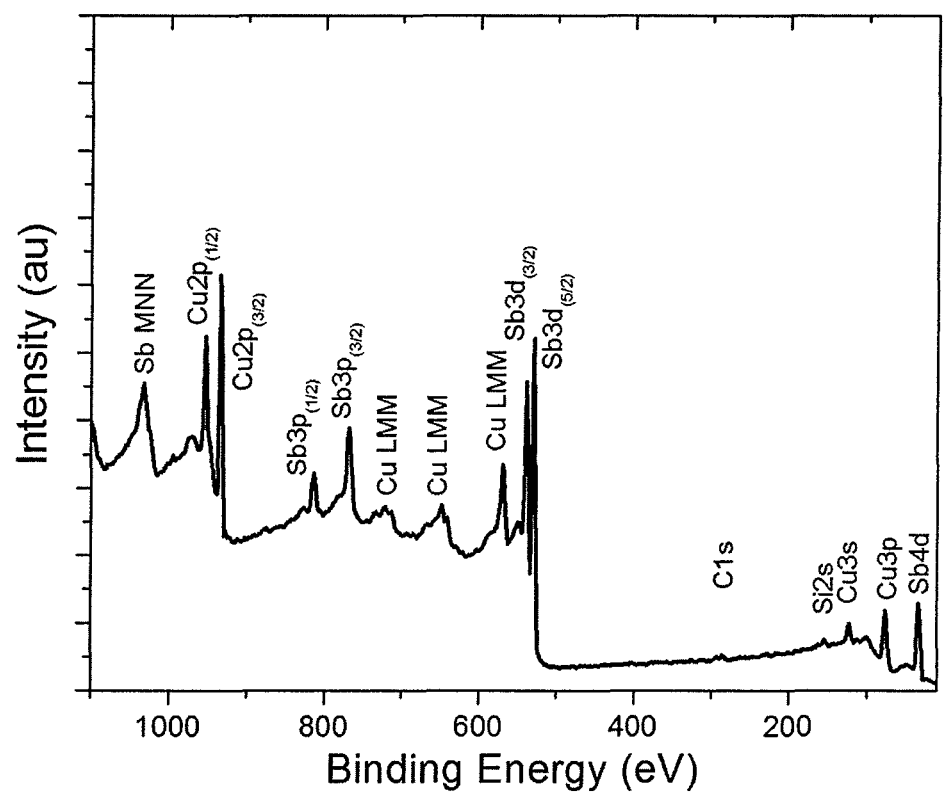
FIG. 3 shows an X-ray photoelectron spectroscopy (XPS) spectrum of an uncoated $Cu_2Sb$ electrode before its incorporation into an electrochemical cell as described in EXAMPLE 1, where all of the peaks can be assigned to copper or antimony, which is indicative of the $Cu_2Sb$ electrode, with the exception of carbon and silicon, and small carbon peaks are common due to advantageous adsorption of carbon from the atmosphere and silicon has been identified as a contaminant introduced during the preparation of the sample for XPS analysis.
Figure 4:
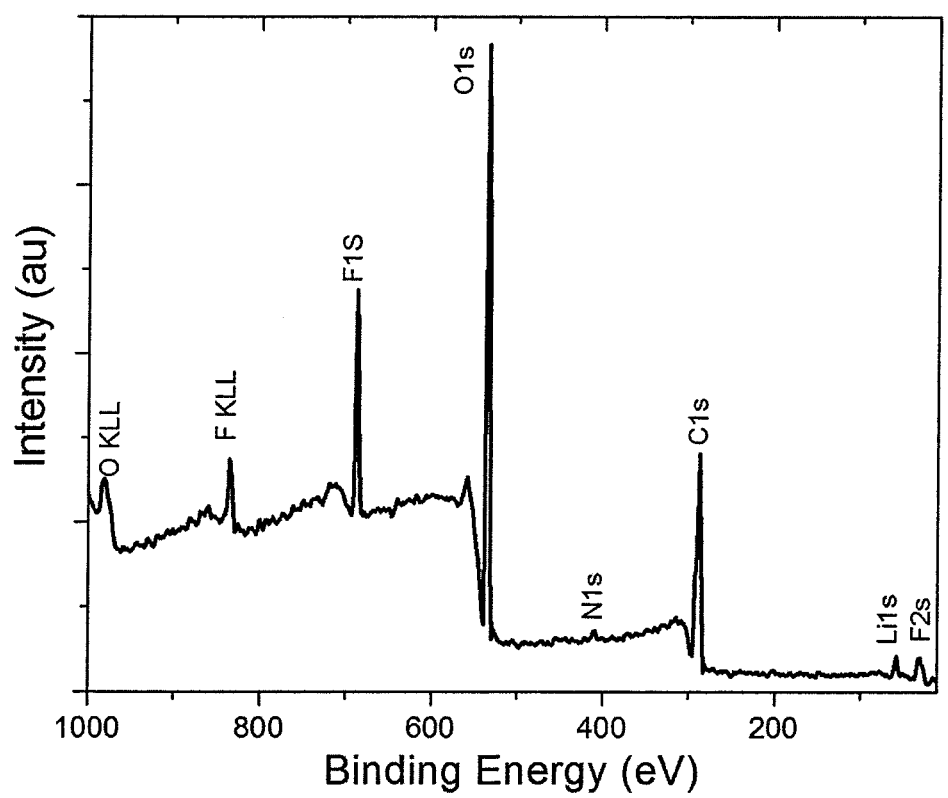
FIG. 4 shows an X-ray photoelectron spectroscopy (XPS) spectrum of a $Cu_2Sb$ electrode coated with a solid-state electrolyte using the electrochemical reduction processes described herein and the post processing procedure as described in the embodiments of this invention as well as EXAMPLE 1, where unlike the spectrum contained in FIG. 3 hereof, neither copper nor antimony can be identified due to the fact that the entire $Cu_2Sb$ electrode surface has been coated with a conformal, pinhole free solid-state electrolyte, and the elemental constituents of the solid-state electrolyte have been identified in the spectrum to be oxygen, fluorine, nitrogen, carbon, and lithium.

Once the $Cu_2Sb$ electrode has been thoroughly cleaned as described above, an X-ray photoelectron spectroscopy (XPS) analysis of the electrode is conducted to determine if the solid electrolyte is defect and pinhole free. Since XPS is a surface sensitive technique, if the solid electrolyte is sufficiently thick to be electrically insulating and there are not holes or defects, photoelectrons generated from the copper and antimony from the photoelectric effect generated by the incident X-rays are not ejected from the sample; and thus are not detected. This is illustrated in FIGS. 3 and 4. FIG. 3 shows an XPS spectrum of a bare $Cu_2Sb$ electrode, that is, an electrode that has not been electrochemically cycled as described in EXAMPLE 1, while FIG. 4 illustrates an XPS spectrum of a $Cu_2Sb$ electrode that has been electrochemically cycled and thoroughly cleaned as described above. As demonstrated by the two spectra, copper and antimony can be detected in the bare $Cu_2Sb$ electrode. However, because of the presence of the solid electrolyte, neither copper nor antimony is detected. The lack of a signal from copper or antimony demonstrates that the solid electrolyte is defect and pinhole free.

Example 3

The use of an electrode slurry composition that allows the second electrode to be incorporated into the Li-ion battery cell without inducing damage to the electrochemically deposited solid electrolyte is shown. A sample is prepared as described in EXAMPLE 1 and thoroughly cleaned as described in EXAMPLE 2. An aqueous slurry including 44.8% $LiFePO_4$, 30.6% polyethylene glycol ($MW_{avg}$=20K Daltons), 10.8% graphite, 9.1% Li-ion conducting ceramic particles, and 4.6% lithium trifluoromethanesulfonate is also prepared. It should be noted that all percent values are calculated by mass. The lithium trifluoromethanesulfonate is dissolved in water followed by the dissolution of polyethylene glycol (PEG). The $LiFePO_4$, graphite, and ceramic particles are then added and mixed well using a homogenizer. After thorough rinsing of the $Cu_2Sb$ with the electrochemically deposited solid electrolyte sample thereon, for which the preparation is described in EXAMPLES 1 and 2, the slurry suspension is applied to the surface of the solid electrolyte. The slurry is then allowed to dry at room temperature. Once dried, the sample is heated overnight at 100° C. under vacuum. The purpose of this step is to remove residual moisture which is detrimental to the performance of Li-ion battery cells.

Upon completion of the drying process, the sample was transferred into an argon dry box containing less than 1 ppm oxygen and water. It was then inserted into a modified Swagelok cell with the dried $LiFePO_4$-based positive electrode facing up. A drop of degassed mineral oil containing graphite was placed on the positive electrode with an aluminum mesh current collector. The mineral oil was used to ensure good electrical contact between the positive electrode and the current collector without inducing shear forces on the electrode which could cause damage to the electrodeposited solid electrolyte. The modified Swagelok cell was sealed and the resistance was recorded using a standard Fluke multimeter, and was found to be on the order of 1 MΩ. The cell was removed from the argon box for further testing.

Figure 5:
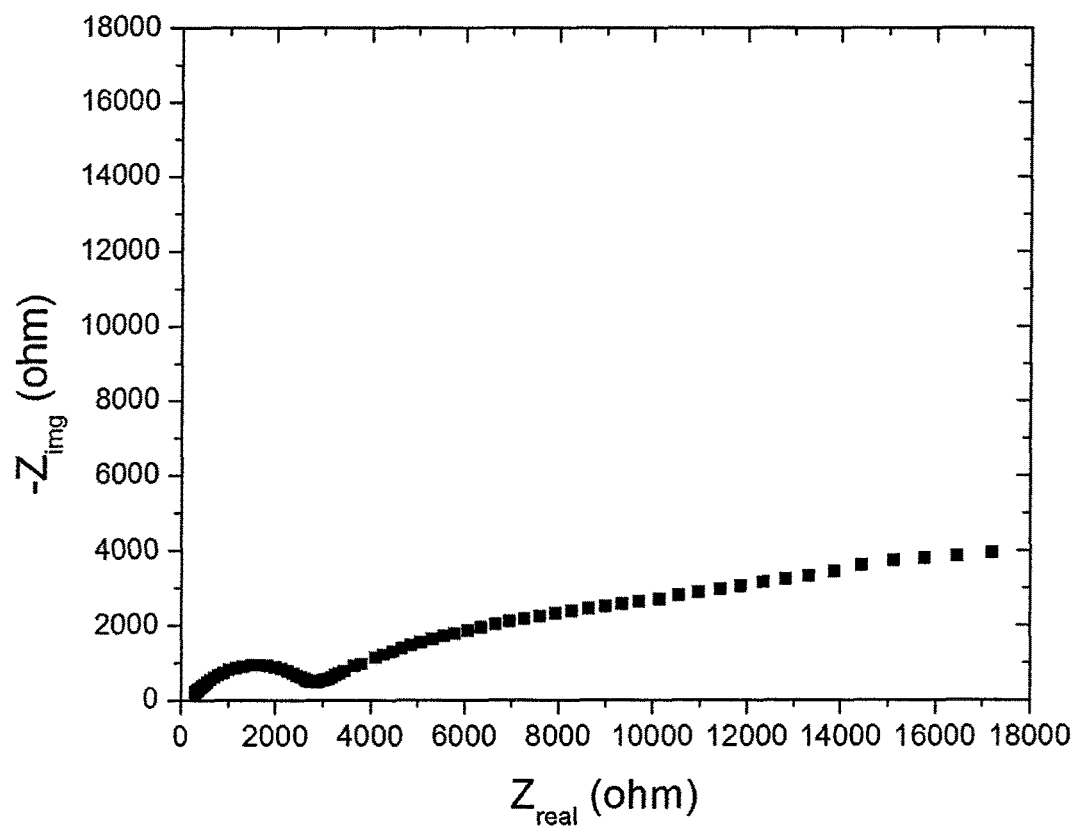
FIG. 5 shows a characteristic Nyquist plot generated from data collected utilizing electrochemical impedance spectroscopy (EIS) techniques from a solid-state lithium-ion cell consisting of a $Cu_2Sb$ based negative electrode, the solid-state electrolyte electrochemically coated onto the surface of the $Cu_2Sb$ electrode, and a positive electrode utilizing $LiFePO_4$ as the active cathode cast directly onto the surface of the solid electrolyte as described herein, the plotted EIS response being indicative of a functional solid-state lithium-ion cell.

To estimate the ionic conductivity of the cell, an electrochemical impedance spectroscopy (EIS) analysis was conducted. A representative Nyquist plot calculated from representative EIS data collected using an initial and final frequency of about $10^6$ and about $10^{-2}$ Hz, respectively with a 10 mV perturbation voltage is illustrated in FIG. 5. Three elongated semi-circles are observed which can be attributed to charge species transport through the bulk material, through grain boundaries, and charge transfer at the current collector surface. Since this spectrum was collected from a cell that contains all three components, anode, solid electrolyte, and cathode, the transport properties through each individual component cannot be separated. The Nyquist plot in FIG. 5 does, however, demonstrate that Li-ions are transported through all of the cell components and thus energy storage is possible.

Figure 6:
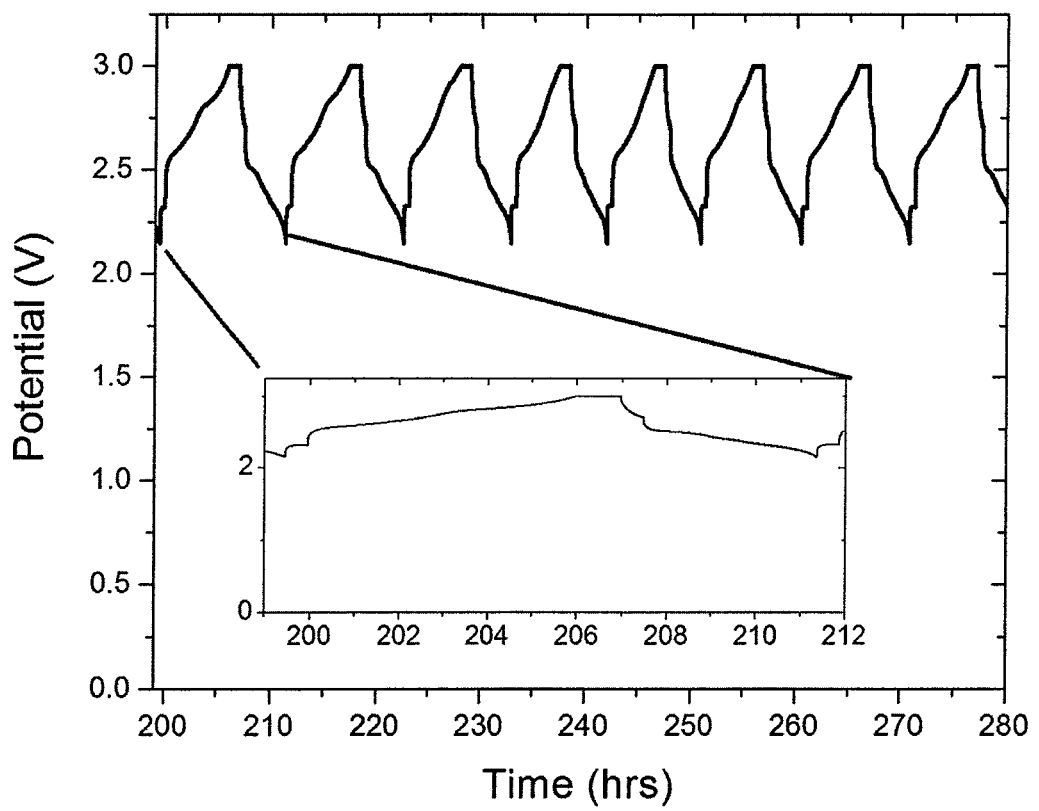
FIG. 6 is a graph of the characteristic voltage response for a cell consisting of a $Cu_2Sb$ based negative electrode, the solid-state electrolyte electrochemically coated onto the surface of the $Cu_2Sb$ electrode, and a positive electrode utilizing $LiFePO_4$ as the active cathode cast directly onto the surface of the solid electrolyte as described herein, the data confirming the conclusion derived from the EIS analysis that a solid-state lithium-ion cell fabricated utilizing the teachings of embodiments of the present invention result in a functional cell.

To determine if the cell described above charges and discharges, the modified Swagelok cell described above was attached to an Arbin BT2143 battery cycler. The cell was repeatedly charged at a C/20 rate, as defined above, to a voltage of 3.0 V and discharged at the same rate to a voltage of 2.25 V. Voltage as a function of time for eight characteristic cycles, defined as a charge and discharge, is shown in FIG. 6. The characteristic plateaus associated with $Cu_2Sb$ are observed in the voltage profiles. The cycling data shown in FIG. 6 in conjunction with the EIS data shown in FIG. 5 demonstrates the ability of the electrochemically deposited hybrid organic-inorganic solid electrolyte to maintain the negative and positive electrodes in electronic isolation, while allowing the transport of Li-ions between the negative and positive electrodes. These are the key characteristics required for a solid electrolyte to function in a Li-ion battery cell.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for forming a conformal, pinhole-free, hybrid organic-inorganic solid electrolyte on an electrode, comprising:

preparing a liquid solution comprising at least one lithium salt in at least one organic carbonate;

attaching the electrode to a current collector;

immersing the electrode in the solution in an electrochemical cell under an inert atmosphere;

immersing a lithium electrode attached to an electrical lead in the solution;

applying a voltage between the electrode and the lithium electrode corresponding to a voltage of electrochemical reduction of the solution, whereby a current is caused to flow therebetween, and electrodeposition of the solid electrolyte occurs on the electrode until the current attains a value of between about the theoretical gravimetrical capacity of the electrode multiplied by the electrode mass and divided by ten and about the theoretical gravimetrical capacity of the electrode multiplied by the electrode mass and divided by 100;

recording the open circuit voltage between the electrode and the lithium electrode as a function of time to determine whether the voltage is stable; and applying the voltage corresponding to the electrodeposition voltage of the solid electrolyte to the electrode until the current attains a value of between about the theoretical gravimetrical capacity of the electrode multiplied by the electrode mass and divided by ten and about the theoretical gravimetrical capacity of the electrode multiplied by the electrode mass and divided by 100 until the open circuit voltage is stable.

2. The method of claim 1, wherein the voltage is applied until the current attains a value of about the theoretical gravimetrical capacity of the electrode multiplied by the electrode mass and divided by twenty.

3. The method of claim 1, wherein the at least one organic carbonate is chosen from ethylene carbonate, dimethyl carbonate, ethyl-methyl carbonate, and propylene carbonate, and mixtures thereof.

4. The method of claim 1, wherein the at least one lithium salt is chosen from $LiPF_6$, $LiAsF_6$, $LiClO_4$, $LiBF_4$, $LiSO_3CF_3$, $LiN(SO_2CF_3)$, $LiPF_3(C_2F_5)_3$, Li-bis(oxalato)borate, and $LiC(SO_2CF_3)_3$, and mixtures thereof.

5. The method of claim 1, wherein the electrode comprises a $Cu_2Sb$ electrode.

6. The method of claim 1, wherein the solution further comprises at least one additive chosen from vinylene carbonate, vinyl ethylene carbonate, and allyl ethyl carbonate, and mixtures thereof.

7. The method of claim 1, wherein the electrochemical cell comprise a porous polyethylene or polypropylene separator effective for allowing lithium ions to pass therethrough.

8. The method of claim 1, wherein the inert atmosphere comprises argon.

9. The method of claim 1, further comprising the steps of cleaning the coated electrode using cleaning solvents for removing the solution therefrom; and performing X-ray photoelectron spectroscopy on the cleaned, coated electrode to determine whether the solid electrolyte coating is conformal and pinhole-free.

10. The method of claim 9, wherein the cleaning solvents are volatile, and do not leave a residue on the coated electrode.

11. The method of claim 10, wherein the solvents are chosen from dimethyl carbonate, diethyl carbonate, and ethyl-methyl carbonate, and mixtures thereof.

* * * * *